(12) United States Patent
Enstad et al.

(10) Patent No.: US 8,126,183 B2
(45) Date of Patent: Feb. 28, 2012

(54) AUDIO SOURCE TRACKING ARRANGEMENT

(75) Inventors: Gisle Enstad, Sandvika (NO); Trygve Frederik Marton, Oslo (NO); Johan Ludvig Nielsen, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 1080 days.

(21) Appl. No.: 11/966,773

(22) Filed: Dec. 28, 2007

(65) Prior Publication Data

US 2008/0174665 A1 Jul. 24, 2008

(30) Foreign Application Priority Data

Dec. 29, 2006 (NO) .................................. 2006-6067

(51) Int. Cl.
*H04N 5/232* (2006.01)
(52) U.S. Cl. ........ 381/360; 381/122; 381/161; 381/353; 381/356; 381/92; 381/95; 381/365; 381/369
(58) Field of Classification Search .................. 381/122, 381/161, 353, 356, 360, 92, 95, 365, 369
See application file for complete search history.

(56) References Cited

U.S. PATENT DOCUMENTS

| 4,152,555 | A | 5/1979 | Modena et al. |
| 4,555,598 | A | 11/1985 | Flanagan et al. |
| 5,778,082 | A | 7/1998 | Chu et al. |
| 5,844,599 | A | 12/1998 | Hildin |
| 5,959,667 | A | 9/1999 | Maeng |
| 6,469,732 | B1 | 10/2002 | Chang et al. |
| 6,707,489 | B1 | 3/2004 | Maeng et al. |
| 7,711,136 | B2 * | 5/2010 | Zhang et al. .................. 381/357 |
| 2003/0228025 | A1 | 12/2003 | Hannah |
| 2005/0008169 | A1 | 1/2005 | Muren et al. |
| 2006/0078146 | A1 * | 4/2006 | Marton et al. ................. 381/361 |
| 2007/0121982 | A1 * | 5/2007 | van Halteren et al. ........ 381/337 |

FOREIGN PATENT DOCUMENTS

| EP | 0 490 486 A2 | 6/1992 |
| EP | 0836324 | 4/1998 |
| GB | 2234137 | 1/1991 |

OTHER PUBLICATIONS

Extended European Search Report issued Jun. 24, 2011, in Patent Application No. 07860922.9.
Wang, H., et al.; "Voice Source Localization for Automatic Camera Pointing System in Videoconferencing", Acoustics, Speech, and Signal Processing. 1997., ICASSP-1997., 1997 IEEE International Conference on Munich, Germany, Apr. 21-24, 1997, Los Alamitos, CA, USA. IEEE Comput. Soc., US, Apr. 21, 1997, ISBN 0-8186-7919-0, vol. 1, pp. 187-190.

* cited by examiner

*Primary Examiner* — Minchul Yang
(74) *Attorney, Agent, or Firm* — Oblon, Spivak, McClelland, Maier & Neustadt, L.L.P.

(57) ABSTRACT

An audio source tracking arrangement, integrated in or connected to a video conference system, for determining a position of a source creating a sound, including: at least an audio signal processing module configured to determine the position of the source creating the sound based on a plurality of audio signals originating from the source respectively captured by a plurality of microphones; and one or more microphone housings, respectively encapsulating at least one of the plurality of microphones, the one or more microphone housings including a cavity in which at least one of the plurality of microphones is localized, an aperture on a surface of the microphone housing, and a channel extending from the cavity to the aperture, wherein the channel and the cavity are dimensioned to form an acoustical amplifier with a frequency response having one or more high frequency peaks in a frequency band of the sound.

6 Claims, 5 Drawing Sheets

US 8,126,183 B2

AUDIO SOURCE TRACKING ARRANGEMENT

CROSS REFERENCE TO RELATED APPLICATIONS

This application claims the benefit of priority under 35 USC §119 from Norway patent Application No. 20066067, filed Dec. 29, 2006, the entire contents of which are incorporated herein by reference.

FIELD OF THE INVENTION

The present application relates to sound source localization, in particular a microphone arrangement particularly configured for capturing audio signals to be used in signal source localization.

BACKGROUND

Signal localization is used in several applications. The most widely known application is perhaps TV program production. In televised debate programs, for example, it is important for the viewer's experience and intelligibility that the active camera is pointing at, and preferably zooming in on, the current speaker. However, this has traditionally been handled manually by a producer. In other applications where cameras and microphones are capturing the view and sound of a number of people, it might be impossible or undesirable to have a dedicated person to control the performance.

One example of an application where cameras and microphones are capturing the view and sound of a number of people is automatic camera pointing in video conferencing systems. A typical situation at an end-point in a video conference call is a meeting room with a number of participants sitting around a table watching the display device of the end-point, while a camera positioned near the display device is capturing a view of the meeting room. If there are many participants in the room, it may be difficult for those who are watching the view of the meeting room at a far end side to determine the speaker or to follow the speaker's arguing. Thus, it would be preferable to localize the active speaker in the room, and automatically point and/or zoom the camera onto that participant. Automatically orienting and zooming of a camera given a certain position within reach of the camera, is well known in the art, and will not be discussed in detail. The problem is to provide a sufficiently accurate localisation of the active speaker, both in space and in time, in order to allow acceptable automatic video conference production.

Known audio source localization arrangements use a plurality of spatially spaced microphones, and are often based on the determination of a delay difference between the signals at the outputs of the receivers. If the positions of the microphones and a delay difference between the propagation paths between the source and the different microphone are known, the position of the source can be determined.

One example of an audio source localisation is shown in U.S. Pat. No. 5,778,082, which is incorporated herein by reference. This patent teaches a method and a system using a pair of spatially separated microphones to obtain the direction or location of an audio source. By detecting the beginning of the respective signals of the microphones representing the sound of the same audio source, the time delay between the audio signals may be determined, and the distance and direction to the audio source may be calculated.

If three microphones are used, it becomes possible to determine a position of the source in a 2-D plane. If more than three microphones, not placed in a single plane, are used, it is possible to determine the position of a source in three dimensions. A common assembly is the placement of one array of microphones in the horizontal direction below the camera, and one single microphone above the camera. This allows both horizontal and vertical source localization. The microphone mounted above the camera may be very dominant visually, may be exposed to potential damage, and may introduce extra manufacturing costs. A solution were a microphone is integrated into a top of the camera itself is therefore preferable. This allows for vertical localization of a source without having a microphone mounted on, e.g., a rod above the camera. The microphone is invisible, well protected, provides possibilities for less intrusive design, and is more visually pleasing. As indicated above, this preference has some disadvantages due to smaller distances between the microphones, implying less accuracy in the signal source tracking.

In addition, sound quality is an important issue for source tracking applications, as good signal quality is also necessary for tracking accuracy. When outputs from several microphones are combined, precise and repeatable frequency response is required in both amplitude and phase, and in wide band. Matching requirements can be lower than 1 dB and a few degrees of phase. This is not found in normal transducer production, not even with high cost microphones. Therefore, manufacturers have to match transducers by measurement and sorting, or product designers must incorporate some form of measurement and calibration of individual microphones. Both alternatives are costly.

Another alternative that recently emerged is to utilize new microphone technology, MEMS (Micro Electro Mechanical Systems). MEMS microphones are produced using silicon wafer technology, and the process gives microphones with variation in phase response that is significantly less than regular ECM (Electret Condenser Microphone) microphones. They are well suited for applications where good phase matching of microphones is required.

Microphone self-noise is, however, a real problem, especially with cheap ECMs. MEMS microphones have even higher self noise than standard ECMs, which is a problem for sound pickup and localization systems, especially at high frequencies.

Background noise in rooms typically has decreasing power with increasing frequency, while many cheap microphone types have a constant or increasing self-noise power with increasing frequency. Speech signals have very low power in the high frequencies, but the high frequency content is still important for natural sounding speech recordings and also provides very effective cues for source localization algorithms. In the high frequencies, the microphone self-noise is the dominant noise contributor, and this limits the signal to noise ratio (SNR) when capturing speech in rooms. This is especially true when microphones cannot be employed close to the persons talking, and limits the potential for localization and tracking algorithms. Analysis algorithms are disturbed because high frequency information in speech is masked by microphone self-noise.

SUMMARY

The application discloses an audio source tracking arrangement for determining a position of a source creating a sound including an audio signal processing module configured to determine the position by means of a number of audio signals originating from the sound respectively captured by the number of microphones and one or more microphone housings respectively encapsulating at least one of the number of microphones including a cavity in which at least one microphone is localized, an aperture on a surface of the encapsulation device and a channel extending from the cavity to the aperture.

BRIEF DESCRIPTION OF THE DRAWINGS

In order to make non-limiting embodiments discussed in the present application more readily understandable, the discussion that follows will refer to the accompanying drawings, wherein.

DETAILED DESCRIPTION

In the following, the present invention will be discussed by describing some exemplary non-limiting embodiments, and by referring to the accompanying drawings. However, people skilled in the art will realize other applications and modifications within the scope of the invention as defined in the enclosed independent claims.

Non-limiting embodiments of the present invention utilize a certain microphone assembly for facilitating audio source tracking systems in communication systems. It can be applied to both single and array microphones. The principal idea is to enhance the sound level acoustically in the critical high frequency range, thereby increasing the effective signal-to-noise ratio both for sound pickup and localization algorithms.

This is done by enclosing the microphone into a channel or a small cavity (a Helmholtz-resonator), thereby introducing a high-frequency response peak (resonance), fairly broadband.

Figure 1:
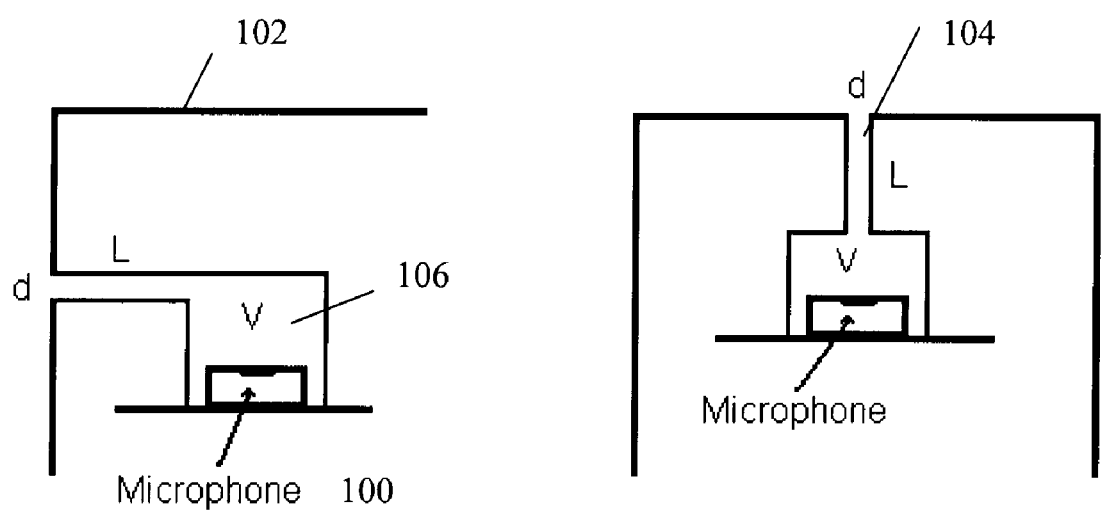
FIG. 1 shows cross sectional views of a microphone housing according to one non-limiting embodiment of the present invention.

FIG. 1 exemplifies this aspect of the present non-limiting embodiment. FIG. 1 shows two cross sectional views of a microphone housing. As can be seen, the microphone element 100 is embedded in an assembly principle or housing 102. The figure shows cross sections of the assembly principle or housing 102. The assembly principle or housing 102 comprises a sound inlet channel 104 with diameter d and length L, and a cavity 106 with volume V enclosing the microphone. The sound inlet channel 104 forms an acoustical resonator together with the cavity 106 encapsulating the microphone 100. This gives an amplified acoustical response in a fairly broad frequency band, improving signal to microphone self-noise ratio in that band. Thus, the device shown in FIG. 1 may function as an acoustical amplifier. The resonance frequency results from interaction between sound inlet channel 104 of diameter d and length L, and the cavity 106 volume V. The shorter the channel length L, and the smaller cavity volume V, the higher the resonance frequency becomes. Increasing channel diameter d also increases resonance frequency. According to the Helmholtz theory, the resonance frequency ($f_r$) can be calculated as follows:

$$f_r = \frac{c}{2\pi} \sqrt{\frac{\pi \left(\frac{d}{2}\right)^2}{VL}}$$

While FIG. 1 shows only one microphone in cavity 106, a plurality of microphones may be in the cavity.

Figure 2:
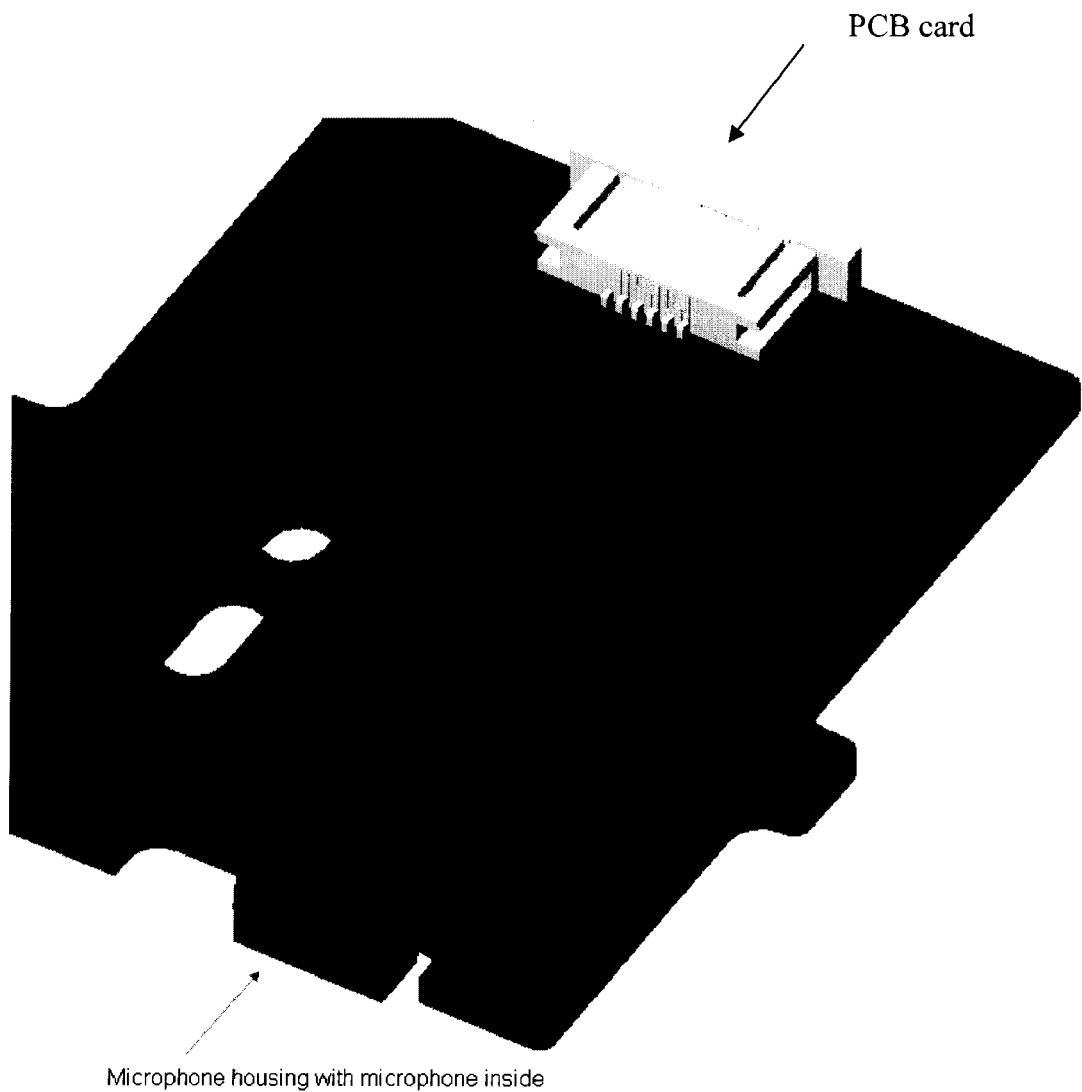
FIGS. 2 and 3 show an example assembly with a microphone housing, a PCB card and a camera mounting.
Figure 3:
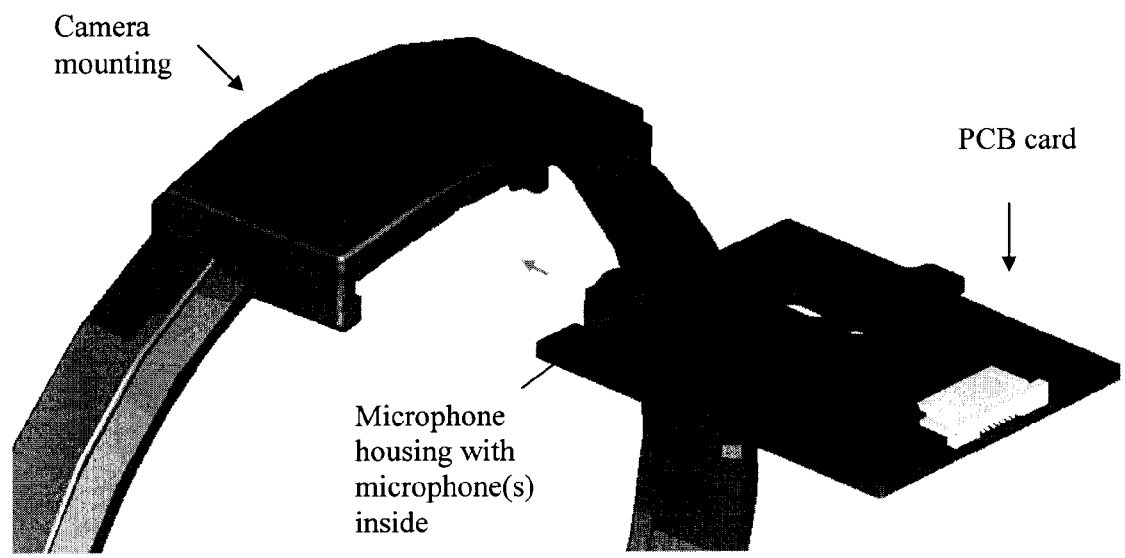

FIGS. 2-3 show a further aspect of a non-limiting embodiment of the present invention. It includes a surface mount MEMS microphone encapsulated by a hard plastic housing on a small PCB card. This PCB card includes a processor that can determine a position of a sound source based on a number of audio signals originating from sound capture by a plurality of microphones. Such techniques are well known to those of ordinary skill in the art and will not be explained here. Alternatively, the processor that performs the calculation may be provided at a remote location with respect to the PCB card and/or microphone. This PCB card with microphone(s) and plastic housing is mounted in a rigid plastic construction. Together these parts form an acoustical resonator system with an inlet sound channel, and a resonant cavity enclosing the microphone as described above. The assembly serves a multitude of functions. As already mentioned, the channel length and volume are adapted to give a resonance peak in the desired high frequency range. The assembly is constructed to ensure easy and secure mounting. The construction also serves to protect the microphone from physical impact and damage, as well as electro static discharge (ESD).

Mechanical protection of the element is preferably secured by making the housing sturdy and rugged out of a hard material. The material should be non-porous so as to minimize sound absorption. An elastomer cast with 80 Shore A hardness is a working compromise. It should be somewhat elastic to withstand varying stresses from the system above it, and to provide a good acoustic seal to ensure that there is no leakage of air from the cavity around the microphone.

The assembly should be acoustically sealed by designing it so that the outer plastic part, to which the microphone card with the microphone housing is mounted, exerts a small pressure on top of the microphone housing. Also, the sound inlet hole to the microphone housing is tightly fitted on to a tube on the surrounding plastic part, extending the sound inlet hole to the front of the outer plastic part.

In this embodiment, ESD protection is achieved by having an exposed conducting pad on the PCB card in front of the microphone, so that the conducting pad is closer to the sound inlet channel than the microphone element is. An ESD pulse through the sound inlet channel will hit the conducting pad, and not the microphone because the pulse will always go to ground the shortest possible way.

Any microphone element requiring sound wave entry from a single direction can be used in the present invention. However, a typical omni directional MEMS microphone is chosen in the described embodiment for repeatable phase response. The size of the element is in principle not important, but the size of the microphone itself, and its sound inlet, has an impact on the minimal size of the cavity enclosing the microphone.

The total free-field response of the microphone in its housing is a convolution of the microphone response, the entry channel volume response, and the pressure-build up effect on the front of the assembly. A high frequency response peak sized and shaped by the mechanical design will invariably result.

For automatic camera control in video conferencing, a microphone array for speaker localization is needed. In one non-limiting embodiment of the present invention, a small number of microphones, typically four, are mounted in connection with the camera. Typically, three microphones form a horizontal array below the camera, and one is placed above, but integrated in the camera forming a vertical microphone pair with the middle microphone in the array below the camera. This allows both horizontal and vertical source localization. The microphone mounted above the camera is very dominant visually. According to this embodiment, the microphone is invisible and well protected, and provides possibilities for less intrusive design, more visually pleasing.

A processor on the PCB card can use audio signals received by microphone(s) to determine a position of the audio source. The video camera used in a video conference (or processor located elsewhere) may use the determined position as a reference point to which an image captured by the camera or the viewed image is adjusted. In other words, the processor on the PCB card, based on the audio signals captured by the acoustical amplifier(s), determines a location of an audio source, and camera is controlled by a processor (located in the camera or elsewhere) to pan to the audio source and/or zoom in on the audio source.

Figure 4:
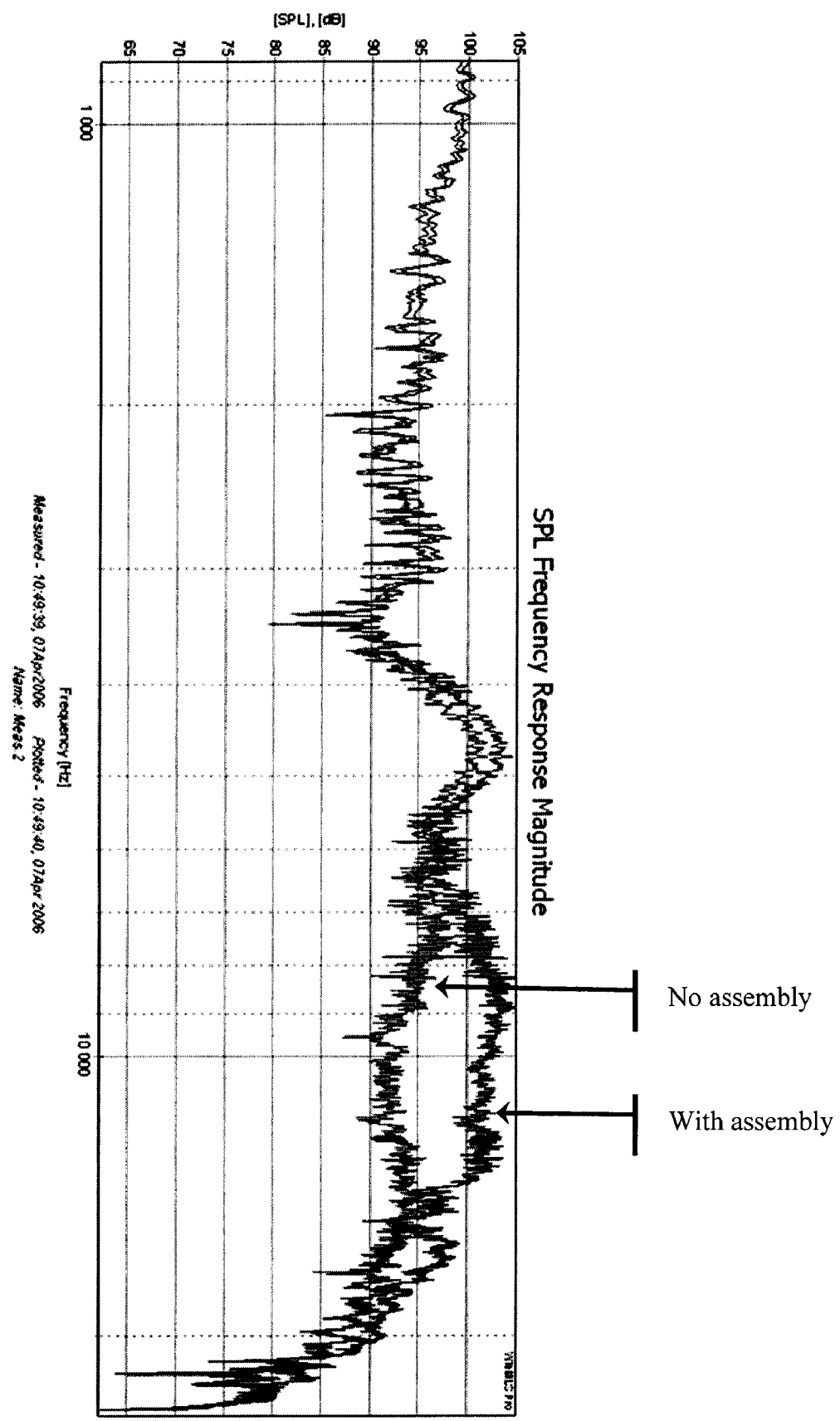
FIG. 4 is a plot of an example of a resulting frequency response when using a non-limiting embodiment of the present invention.

FIG. 4 shows a plot of the resulting amplitude response of a microphone mounted in the solution described above for a non-limiting embodiment of the present invention, versus the response of the same microphone in open air. As can be seen, a resonant peak gives from 3 to 7 dB acoustic amplification in the frequencies from about 8 kHz to 11 kHz (i.e., high frequencies) for the embodiment shown in FIG. 1. The shape and frequency range of the resonance can be changed by adjusting the mechanical design enclosing the microphone.

This influence on the frequency response is dominant compared to the effect of reflection and diffraction from nearby objects, and can therefore provide a response with less variation for changing angle from the sound source, which is advantageous.

For most purposes other than audio source tracking, the frequency response is preferred to be flat to avoid sound distortion. In this case, the sound captured by the microphone is not supposed to reach a human ear, but is instead used for detection. It optimizes clarity and improves the signal-to-noise ratio in the following analog-to-digital converter if the system is digital. Due to the noise and a relatively short distance between the microphone elements, it is important in sound source detection to have a strong detection signal relative to the noise floor. Thus, a peak in the frequency response in the high frequency area is in this case an advantage.

Figure 5:
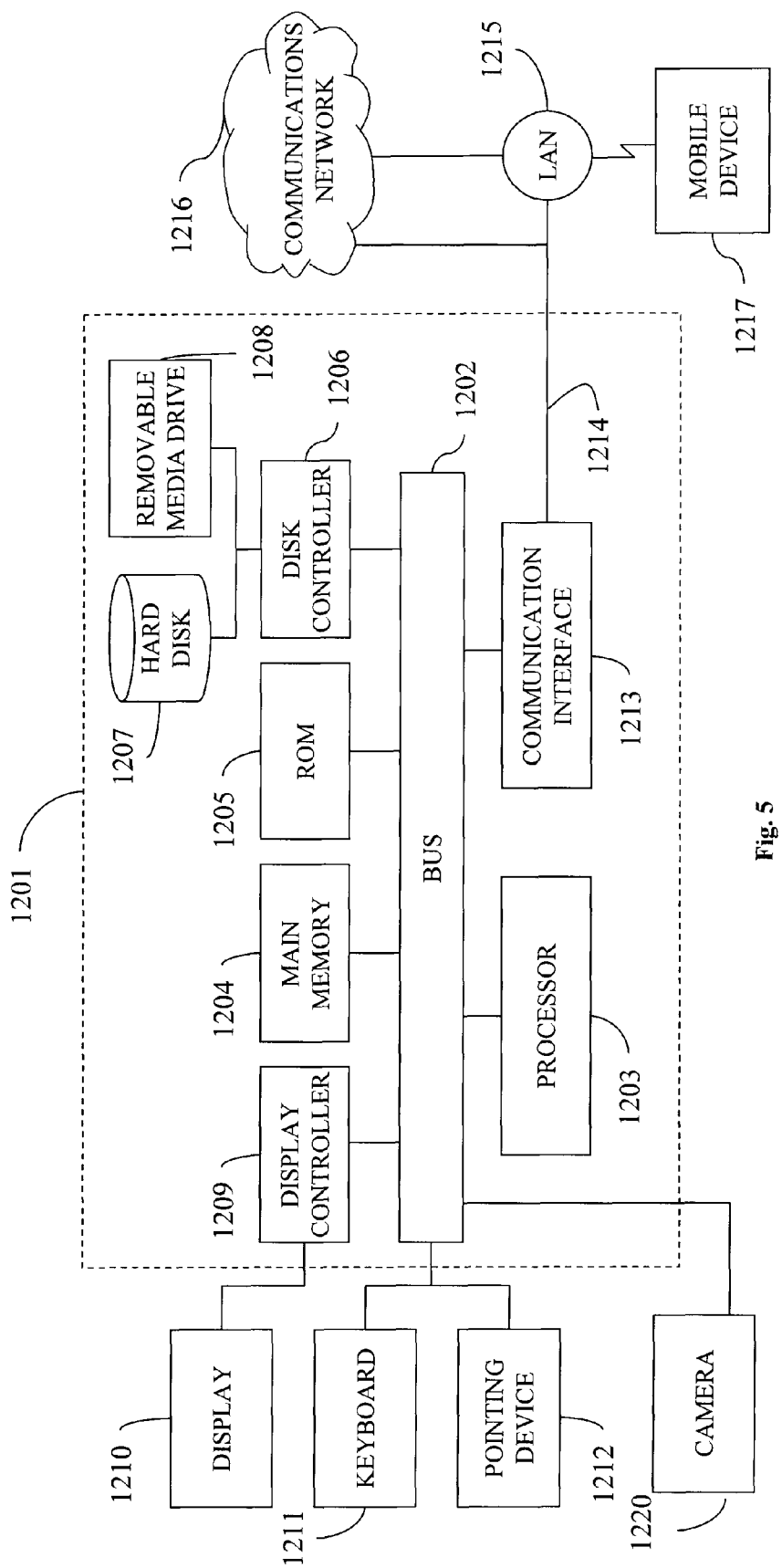
FIG. 5 illustrates a computer system upon which an embodiment of the present invention may be implemented.

FIG. 5 illustrates a computer system 1201 upon which an embodiment of the present invention may be implemented. The computer system shown in FIG. 5 may be used to control a camera in a video conference. Also, the PCB card discussed above may include features discussed below, such as (but not limited to) a processor and memory. A person of ordinary skill in the art would recognize what components should be included in the PCB card to perform appropriate functions.

The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 may also control camera 1220 to pan and zoom so as to capture an image of a person speaking during a video teleconference.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable storage medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., video conference participants). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable storage medium" as used herein refers to any medium that participates in providing instructions to the processor 1203 for execution. A computer readable storage medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable storage media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The invention claimed is:

1. An audio source tracking arrangement, integrated in or connected to a video conference system, for determining a position of a source creating a sound, comprising:
   at least an audio signal processing module configured to determine the position of the source creating the sound based on a plurality of audio signals originating from the source respectively captured by a plurality of microphones; and
   one or more microphone housings, respectively encapsulating at least one of said plurality of microphones, said one or more microphone housings including a cavity in which at least one of said plurality of microphones is localized, an aperture on a surface of the microphone housing, and a channel extending from the cavity to the aperture, wherein
   said channel and said cavity are dimensioned to form an acoustical amplifier with a frequency response having one or more high frequency peaks in a frequency band of the sound.

2. The sound source tracking arrangement according to claim 1, wherein said plurality of microphones are MEMS microphones.

3. The sound source tracking arrangement according to claim 1, wherein said plurality of microphones and the one or more microphone housings are integrated in a camera cover.

4. The sound source tracking arrangement according to claim 1, wherein the position defines a reference point relative to which a camera or a processor adjusts a captured or viewed image.

5. The sound source tracking arrangement according to claim 2, wherein said plurality of microphones and the one or more microphone housings are integrated in a camera cover.

6. The sound source tracking arrangement according to claim 2, wherein the position defines a reference point relative to which a camera or a processor adjusts a captured or viewed image.

* * * * *